Oct. 30, 1945.    J. B. BLACK ET AL    2,388,112
METHOD AND APPARATUS FOR COOLING HYDRAULIC COUPLING BRAKES
Filed March 22, 1944    2 Sheets-Sheet 1

Inventors:
James B. Black
Wilbur F. Shurts
By: John W. Darley
Attorney.

Oct. 30, 1945.     J. B. BLACK ET AL     2,388,112
METHOD AND APPARATUS FOR COOLING HYDRAULIC COUPLING BRAKES
Filed March 22, 1944     2 Sheets-Sheet 2
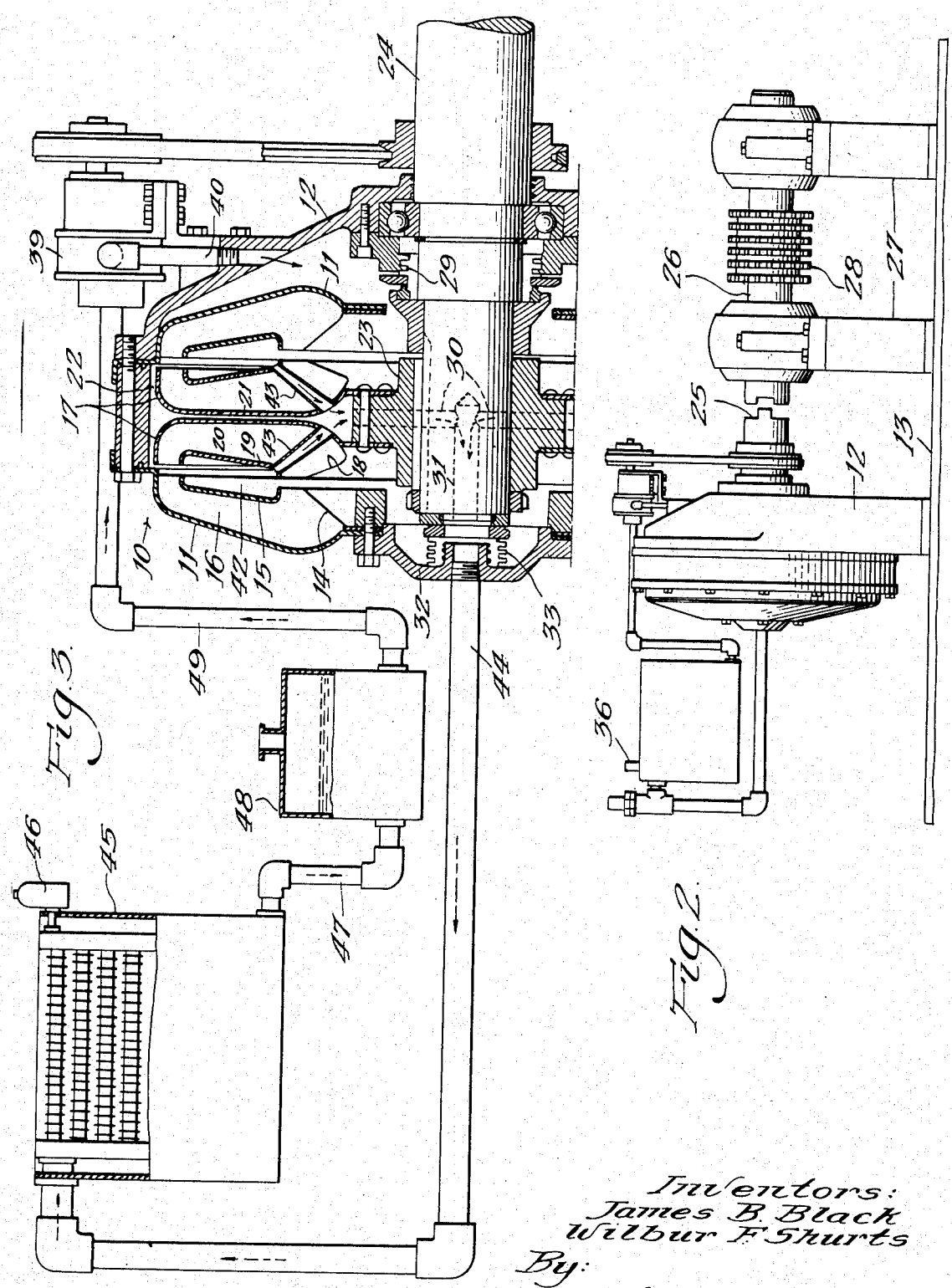
Inventors:
James B. Black
Wilbur F. Shurts Patented Oct. 30, 1945

2,388,112

UNITED STATES PATENT OFFICE 2,388,112

METHOD AND APPARATUS FOR COOLING HYDRAULIC COUPLING BRAKES

James B. Black and Wilbur F. Shurts, Rockford, Ill., assignors to Twin Disc Clutch Company, Racine, Wis., a corporation of Wisconsin Application March 22, 1944, Serial No. 527,662

14 Claims. (Cl. 188—90)

Our invention relates to a method and apparatus for cooling hydraulic coupling brakes such as are commonly used to control the speed of a descending load, as in oil well rigs and comparable structures.

Brake couplings of this type are characterized by the same general blade construction as hydraulic couplings for transmitting power, but differ from the latter in that one of the bladed members is held stationary, while the other bladed member is connected to the load and is arranged for rotation. The brake therefore operates as a hydraulic coupling with 100% slip in which the energy created by the load is absorbed by liquid friction within the brake. While maximum braking resistance is developed when the brake is operated full of liquid without discharging liquid therefrom, it has been found necessary to circulate the working liquid through the brake in order to avoid the creation of excessive temperatures and the formation of steam or vapor, depending upon the nature of the liquid, which would lessen the braking effort.

It is therefore the principal object of our invention to provide a method and apparatus for cooling hydrodynamic brakes which enables the brake to be operated in completely filled condition while effecting a separation of the liquid from the vaporized component of the liquid within the brake and an evacuation of vapor from the brake.

A further object is the devising of a method and apparatus of the character indicated in which provision is made, in the event that water is employed as the working liquid, for retarding the rate of scale deposits on the blades of the unit.

A further object is to provide a brake wherein the maximum braking resistance is developed by continuously supplying liquid to the brake to replace steam or vapor being discharged, thus maintaining the brake filled with liquid.

A further object is to devise a hydraulic coupling brake which is internally constructed and arranged to separate the liquid and its vapor without affecting the primary operation of the unit.

These and further objects of our invention will be set forth in the following specification, reference being had to the accompanying drawings, and the novel means by which said objects are effectuated will be definitely pointed out in the claims.

In the drawings:

Fig. 2 is a view showing a suggested arrangement for driving the rotor member of the brake.

Fig. 3 is an elevation, partly in section, showing a modified method of cooling and evacuating vapor from a coupling brake.

Figure 1:
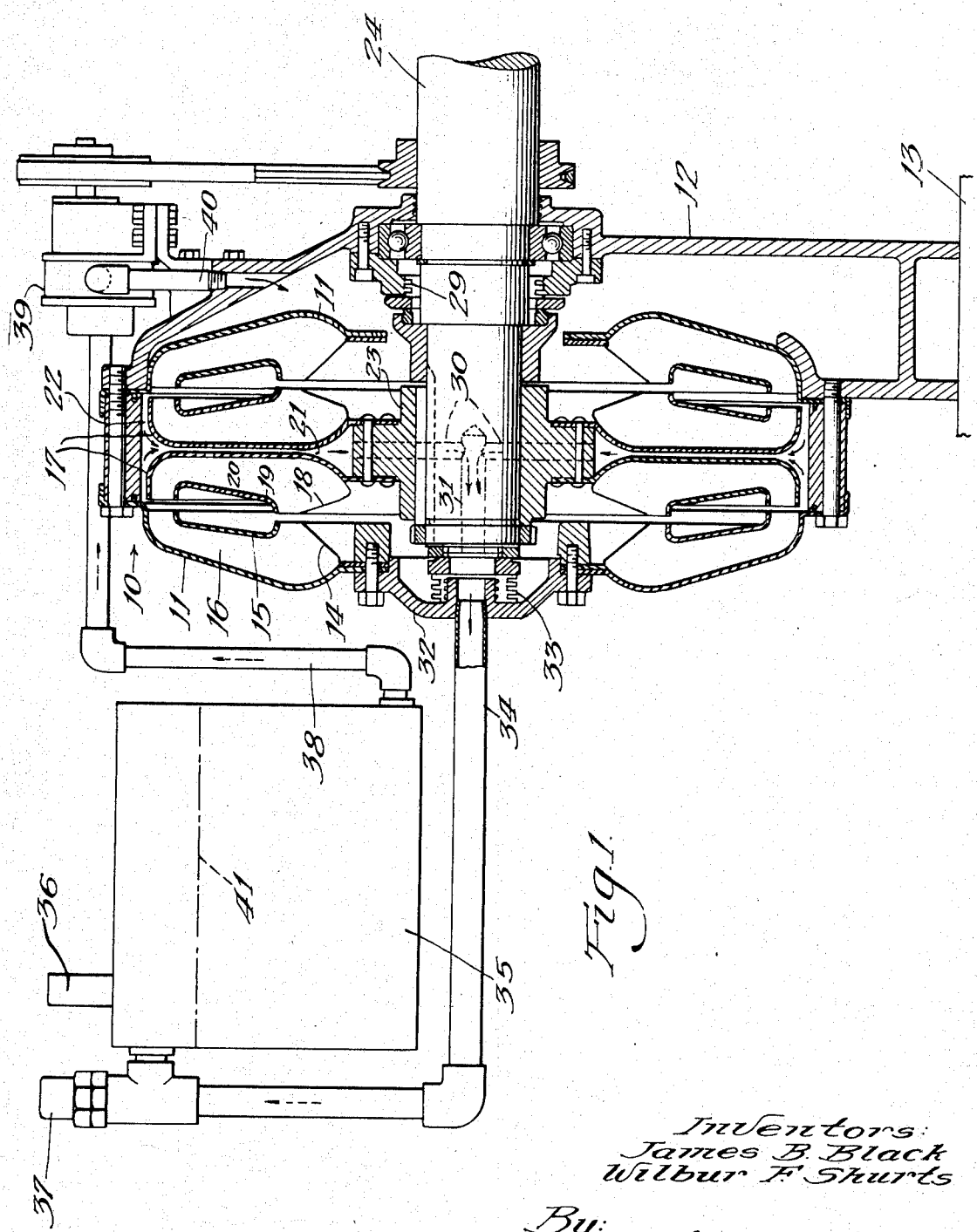
Fig. 1 is an elevation, partly in section, of a hydraulic coupling brake showing one method of cooling.

Referring to Figs. 1 and 2, the numeral 10 designates the stator member of the brake which comprises a pair of annular shells 11—11 arranged in facing relation and bolted to a frame 12 that is rigidly secured to a base plate or foundation 13. Each shell carries a plurality of circumferentially spaced, radial blades 14 which define with a shroud ring 15 and the associated shell a plurality of radial passages 16. The rotor member is located between the shells 11—11 and is constituted by a pair of annular shells 17—17 which face in opposite directions and in cooperating relation, respectively, to the shells 11—11. Each shell 17 also carries a plurality of circumferentially spaced, radial blades 18 which define with a shroud ring 19 and the associated shell 17 a plurality of radial passages 20. To the extent described above, the brake is of standard construction.

The shells 17 are spaced to define an annular passage 21 providing a means of communication between certain discharge passages inwardly of the brake, as presently described, and an annular space 22 disposed between the inner periphery of the frame and the outer peripheries of the shells 17, while the inner ends of the shells are secured to a hub 23 that is keyed to a shaft 24. The shaft extends outwardly through and is journaled in the frame 12 and may be coupled through a clutch 25 (see Fig. 2) with a driving shaft 26 journaled in a pair of pedestal bearings 27. Secured to the shaft 26 is a sprocket 28 that is driven from a drum or reel shaft (not shown). The clutch 25 is intended to generically represent any type of clutching connection between the shafts 24 and 26, including jaw, friction and one-way or overrunning clutches. Suitable packing 29 may be provided between the frame 12 and shaft 24 to prevent leakage of the liquid at this point.

A plurality of radial passages 30 extend transversely of the shaft 24 and hub 23 and provide communication between the passage 21 and an axial passage 31 that extends toward and terminates at the left end of the shaft, as viewed in Fig. 1. A cover plate 32 is secured to the left hand shell 11, closing the stator in this location, and an annular seal 33 extends between the plate and the left end of the shaft.

One end of a pipe 34 is carried by the plate 32 in communicating relation to the shaft passage 31, while the opposite end extends upwardly beside and connects with the upper portion of a reserve liquid tank 35 having an open filler pipe 36 through which liquid may be supplied to the tank as desired. The tank end of the pipe also carries a suitable pressure regulating valve 37 which may be adjusted to relieve steam and air into the tank at any predetermined pressure. Liquid is withdrawn from the bottom of the tank 35 through a pipe 38 by means of a pump 39, preferably of the positive displacement type, that is belt-pulley driven from the shaft 24. The pump discharge is delivered through a pipe 40 to the interior of the stator 10 between the right hand shell 11 and the frame 12.

The brake will operate with any liquid, but assuming the use of water for purpose of description, it will be obvious that when the shafts 24 and 26 are coupled by the clutch 25, with the latter connected to a descending load, as in the operation of an oil well rig, the energy absorption within the brake will be reflected in a rise in temperature of the water and the production of vapor or steam. Since the water possesses the greater mass, it will tend to move radially of the brake under the impulse of centrifugal force so that the steam, together with air expelled from the water by the heat, is driven through the passage 21 into the passages 30 and thence through the passage 31 and pipe 34. Any particles or drops of water entrained in the steam are returned to the tank, but there is a certain loss of liquid from the system due to the intermittent operation of the valve 37 which relieves steam and air liberated from the water. This water loss may be replaced occasionally through the filler pipe 36 to maintain a water level in the tank 35 as generally indicated by the line 41 in Fig. 1. If desired, the liquid level in the tank may be automatically maintained by a float operated valve (not shown) controlling flow from any liquid source.

The pump 39 possesses sufficient capacity to overcome any pressure within the brake and constantly supplies an amount of water adequate to replace that converted into steam, thus always maintaining the brake in a completely filled and cooled condition and enabling the brake to exert its maximum resistance.

In Fig. 3 is illustrated a modified arrangement for cooling a hydrodynamic brake which is characterized by an important operating advantage, relative to that shown in Fig. 1, if water is used as the working liquid. It is well known that, in hard water regions, if fresh water is passed through a heater of any description, whether continuously or intermittently, and is heated to a temperature in excess of about 140° F., scale deposits are formed in the heater by the lime and other substances in the water. Since this temperature is characteristically exceeded in a hydraulic coupling brake, it will be obvious that in the Fig. 1 embodiment, with its periodic replenishment of fresh water, scale deposits may form rapidly on the blading and other surfaces of the brake with possible clogging of the radial passages and an unbalancing of the rotor. In the Fig. 3 modification, the seriousness of this problem is greatly reduced by reclaiming the steam through condensation. The original amount of water may therefore be used indefinitely, except for minor losses due to leakage and evaporation, so that scale deposits are reduced to a minimum.

Since the brake shown in Fig. 3 is identical with that illustrated in Fig. 1, except for the method of separating the steam or vapor from the liquid, corresponding parts are identified by like numerals. Instead of utilizing centrifugal action to separate the liquid and its vapor, advantage is taken of the fact that a zone of reduced pressure exists in the annular space 42 between the shroud rings 15 and 19 due to the rotational movement of the liquid about this space. Accordingly, steam, if water is used, will tend to collect in this space and will be discharged through a plurality of conduits 43, each of which is bridged between the ring 19 and shell 17, into the space 21 adjacent the hub 23.

The steam then passes through the passages 30 and 31 into one end of a pipe 44 carried by the cover plate 32 which delivers the steam to a condenser 45 that is preferably of the air cooled type and which is provided in an upper portion with an air vent 46 that prevents the formation of air pockets in the condenser. The condensate flows through a pipe 47 to a reserve tank 48 that is always open to the atmosphere and liquid is withdrawn from the tank through a pipe 49 by the pump 39 which delivers the liquid through the pipe 40 to the brake between the right hand, stator shell 11 and frame 12. As in Fig. 1, the pump has sufficient capacity to overcome any pressure in the unit due to generation of steam.

From the foregoing, it will be obvious that the cooling of the brake is accomplished in a closed system. Starting with an original amount of liquid, the latter may be used indefinitely without loss, excepting the comparatively minor ones due to leakage and evaporation. Therefore, if water is used, scale formation in the brake will proceed at a very slow rate since the water that need be added from time to time will be negligible in amount.

The drawings are only intended to show the systemic relation of the several parts and it will therefore be understood that the parts under operating conditions will be arranged to effect the cooling methods outlined and to accommodate the liquid levels in the different parts when the brake is at rest. Further, the brake units shown in Figs. 1 and 3 may be used with either method of cooling. Wherever, the term "steam" is employed in the above description, it is intended to include the vaporization of water, as well as that of any liquid, such as oil.

We claim:

1. The method of cooling a hydraulic coupling brake during operation which comprises centrifugally separating the liquid and the vaporized component of the liquid within the brake, conducting the vapor inwardly from the peripheral to the axial portion of the brake and returning particles of liquid entrained with the vapor to a source of liquid supply, and continuously delivering liquid from the source to the brake in an amount at least equivalent to the liquid vaporized.

2. The method of cooling a hyraulic coupling brake during operation which comprises centrifugally separating the liquid and the vaporized component of the liquid within the brake, conducting the vapor inwardly from the peripheral to the axial portion of the brake and condensing and returning the vapor condensate to a liquid source of supply, and continuously delivering liquid from the source to the brake in an amount at least equivalent to the liquid vaporized.

3. A hydraulic coupling brake comprising a stator, a rotor having a passage connecting the peripheral space around the rotor with an axial portion of the rotor and through which the vapor component of the liquid is driven by centrifugal action, a reserve liquid tank communicating with the portion for receiving particles of liquid entrained with the vapor, and means for delivering liquid from the tank to the brake.

4. A hydraulic coupling brake comprising a stator having a pair of shells arranged in facing relation and provided with a plurality of radial, liquid passages, a rotor having a pair of oppositely facing and spaced shells disposed between the stator shells and having a plurality of radial passages cooperatively related to the stator passages, the spacing of the rotor shells providing a means of communication between the peripheral zone around the rotor and a substantially axial passage provided in the rotor and through which the vapor component of the liquid is driven by centrifugal action, a reserve liquid tank communicating with the passage in the rotor for receiving particles of liquid entrained with the vapor, and means for supplying liquid from the tank to the brake.

5. A hydraulic coupling brake comprising a stator, a rotor having a passage connecting the peripheral space around the rotor with an axial portion of the rotor and through which the vapor component of the liquid is driven by centrifugal action, means communicating with the portion for condensing the vapor, a reserve tank for collecting the condensate, and means for supplying liquid from the tank to the brake.

6. A hydraulic coupling brake comprising a stator having a pair of shells arranged in facing relation and provided with a plurality of radial passages, a rotor having a pair of oppositely facing and spaced shells disposed between the stator shells and having a plurality of radial passages cooperatively related to the stator passages, the spacing of the rotor shells providing a means of communication between the peripheral zone around the rotor and a substantially axial passage in the rotor and through which the vapor component of the liquid is driven by centrifugal action, means communicating with the rotor passage for condensing the vapor, a reserve liquid tank for collecting the condensate, and means for supplying liquid from the tank to the brake.

7. A hydraulic coupling brake comprising stator and rotor members having cooperating liquid passages substantially enclosing an annular space of lower pressure in which the vaporized component of the liquid collects during operation, conduit means connecting the space with a substantially axial passage in the rotor, a reserve liquid tank communicating with the rotor passage for receiving particles of liquid entrained with the vapor, and means for supplying liquid from the tank to the brake.

8. A hydraulic coupling brake comprising stator and rotor members having cooperating liquid passages substantially enclosing an annular space of lower pressure in which the vaporized component of the liquid collects during operation, conduit means connecting the space with a substantially axial passage in the rotor, means communicating with the rotor passage for condensing the vapor, a reserve liquid tank for collecting the condensate, and means for supplying liquid from the tank to the brake.

9. A hydraulic coupling brake structure comprising a stator and a rotor having cooperating liquid passages for hydraulically absorbing power, the rotor having a conduit connecting the peripheral space around the rotor with an axial portion of the rotor and through which the vapor component of the liquid is driven by centrifugal action, and the conduit being disposed clear of the passages in the rotor.

10. A hydraulic coupling brake structure comprising stator and rotor members having cooperating liquid passages substantially enclosing an annular space of lower pressure in which the vaporized component of the liquid collects during operation, and conduit means connecting the radially innermost portion of the space with a substantially axial passage in the rotor through which the vapor is led from the space.

11. A hydraulic coupling brake comprising a stator having a pair of shells arranged in facing relation and provided with a plurality of radial, liquid passages, a rotor having a pair of oppositely facing shells disposed between the stator shells and having a plurality of radial passages cooperatively related to the stator passages, conduit means providing a means of communication between the peripheral zone around the rotor and a substantially axial passage provided in the rotor and through which the vapor component of the liquid is driven by centrifugal action, a reserve liquid tank communicating with the passage in the rotor for receiving particles of liquid entrained with the vapor, and means for supplying liquid from the tank to the brake.

12. A hydraulic coupling brake comprising a stator having a pair of shells arranged in facing relation and provided with a plurality of radial, liquid passages, a rotor having a pair of oppositely facing shells disposed between the stator shells and having a plurality of radial passages cooperatively related to the stator passages, conduit means between the rotor shells providing a means of communication between the peripheral zone around the rotor and a substantially axial passage provided in the rotor and through which the vapor component of the liquid is driven by centrifugal action, a reserve liquid tank communicating with the passage in the rotor for receiving particles of liquid entrained with the vapor, and means for supplying liquid from the tank to the brake.

13. A hydraulic coupling brake comprising a stator having a pair of shells arranged in facing relation and provided with a plurality of radial, liquid passages, a rotor having a pair of oppositely facing shells disposed between the stator shells and having a plurality of radial passages cooperatively related to the stator passages, conduit means providing a means of communication between the periperal zone around the rotor and a substantially axial passage provided in the rotor and through which the vapor component of the liquid is driven by centrifugal action, means communicating with the rotor passage for condensing the vapor, a reserve liquid tank for collecting the condensate, and means for supplying liquid from the tank to the brake.

14. A hydraulic coupling brake comprising a stator having a pair of shells arranged in facing relation and provided with a plurality of radial, liquid passages, a rotor having a pair of oppositely facing shells disposed between the stator shells and having a plurality of radial passages cooperatively related to the stator passages, the cooperating stator and rotor passages enclosing a pair of annular spaces of lower pressure in which the vaporized component of the liquid collects during operation, conduit means connecting the spaces with a substantially axial passage in the rotor, a reserve liquid tank communicating with the rotor passage for receiving particles of liquid entrained with the vapor, and means for supplying liquid from the tank to the brake.

JAMES B. BLACK.
WILBUR F. SHURTS.